United States Patent [19]

Sato et al.

[11] Patent Number: 5,077,247
[45] Date of Patent: Dec. 31, 1991

[54] DIELECTRIC CERAMIC FOR MICROWAVE APPLICATIONS

[75] Inventors: Hosaku Sato; Ayusawa Kazutoshi; Toru Arai, all of Tokyo, Japan

[73] Assignee: Oki Electric Industry Co., Ltd., Tokyo, Japan

[21] Appl. No.: 563,556

[22] Filed: Aug. 6, 1990

[30] Foreign Application Priority Data

| Aug. 9, 1989 | [JP] | Japan | 1-206566 |
| Aug. 18, 1989 | [JP] | Japan | 1-212641 |
| Dec. 13, 1989 | [JP] | Japan | 1-323226 |
| Dec. 20, 1989 | [JP] | Japan | 1-330677 |

[51] Int. Cl.$^5$ .............................................. C04B 35/46
[52] U.S. Cl. ............................... 501/137; 501/138; 501/139
[58] Field of Search ............... 501/136, 138, 139, 137

[56] References Cited

U.S. PATENT DOCUMENTS

| 4,330,631 | 5/1982 | Kawashima et al. | 501/139 |
| 4,535,064 | 8/1985 | Yoneda | 501/138 |
| 4,699,891 | 10/1987 | Sato et al. | 501/139 |
| 4,753,906 | 6/1988 | Nishigaki et al. | 501/139 |
| 4,987,107 | 1/1991 | Narumi et al. | 501/138 X |

FOREIGN PATENT DOCUMENTS

| A-2637762 | 2/1978 | Fed. Rep. of Germany . |  |
| 0131901 | 10/1980 | Japan | 501/139 |
| 0040805 | 3/1982 | Japan | 501/139 |
| 0040806 | 3/1982 | Japan | 501/139 |
| 61-14606 | 4/1986 | Japan . |  |

OTHER PUBLICATIONS

World Patents Index Latest Accession No. 80-85052C (Weed 48), Derwent Publications Ltd., London & JP55131901 (KCK KK) 15-01-1980.
Chemical Abstracts, vol. 107, No. 8, Aug. 24, 1987, Columbus, Ohio, U.S.A., K. Sasazawa: "Dielectric Ceramic Compositions", p. 689; left-hand column; ref. No. 69267N *abstract* & JP-A-6205509 (Taiyo Yuden Co., Ltd.).
Chemical Abstracts, vol. 103, No. 4, Jul. 1985, Columbus, Ohio U.S.A.,"Dielectric Ceramic Composition", p. 585; left-hand column; ref. No. 31271P & JP-A-6044905 (Matsushita Electric Industrial Co., Ltd.) *abstract*.
Chemical Abstracts, vol. 106, No. 24, Jun. 1987, Columbus, Ohio, U.S.A., H. Watai et al.: "Dielectric Ceramics", p. 684; right-hand column; ref. No. 206406C *abstract* & JP-A-6217069 (Mitsubishi Electric Corp.).

*Primary Examiner*—Karl Group
*Attorney, Agent, or Firm*—Wenderoth, Lind & Ponack

[57] ABSTRACT

A dielectric ceramic for microwave applications is comprised of:

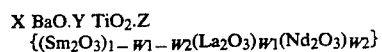

where X, Y, Z lie in the ranges: $11.0 \leq X \leq 22.0$; $60.0 \leq Y \leq 75.0$; and $6.0 \leq Z \leq 28.0$ ($X+Y+Z=100$) expressed in mole %, and $0 < W_1 \leq 0.35$; $0 < W_2 < 1$; and $0 < (1-W_1-W_2) < 1$; where $W_1$, $W_2$ and $(1-W_1-W_2)$ are mole ratios. $MnO_2$ or $Al_2O_3$ may also be added.

Alternatively, a dielectric ceramic may comprise:

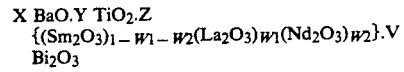

where X, Y, Z and V lie in the ranges: $11.5 \leq X \leq 21.0$; $60.0 \leq Y \leq 76.0$; $6.5 \leq Z \leq 26.0$; and $0.1 \leq V \leq 5.0$ ($X+Y+Z+V=100$), expressed in mole %, and $0 < W_1 < 1$; $0 < W_2 < 1$; $0 \leq (1-W_1-W_2) < 1$, where $W_1$, $W_2$ and $(1-W_1-W_2)$ are mole ratios. $MnO_2$, $CeO_2$, $PbO$, or $Al_2O_3$ may also be added.

The dielectric ceramic of the invention has a high dielectric constant $\epsilon_r$ and a high unloaded Q ($Q_u$), and moreover, the temperature coefficient $\tau_f$ of the resonant frequency can be varied over a wide range by varying the composition.

14 Claims, No Drawings

DIELECTRIC CERAMIC FOR MICROWAVE APPLICATIONS

FIELD OF THE INVENTION

This invention concerns a dielectric ceramic for microwave applications, and in particular, a dielectric ceramic composition for microwave applications having a high dielectric constant $\epsilon_r$, a high unloaded Q, and temperature coefficient $\tau_f$ which can be made to vary above or below zero by varying the composition.

BACKGROUND OF THE INVENTION

It is known that in general, for dielectric resonators for microwave circuits or temperature compensation ceramic (porcelain) capacitors or the like, dielectric ceramic (porcelain) compositions are required to have a high dielectric constant $\epsilon_r$ and unloaded Q ($Q_u = 1/\tan\delta$), and it must be possible to design them with any desired value for the temperature coefficient $\tau_f$ of the resonant frequency above or below zero, i.e., with a positive or negative temperature coefficient. Conventionally, such compositions included $Bao.TiO_2$ systems, $MgTiO_3.CaO$ systems, $ZrO_2.SnO_2.TiO_2$ systems, and $BaO.TiO_2.Sm_2O_3.La_2O_3$ systems (see for example Japanese Patent Kokoku Publication No. 61-14606).

When dielectric resonators or capacitors were manufactured with these compositions, however, their dielectric constant $\epsilon_r$ was 60 to 80 when their temperature coefficient $\tau_f$ was in the region of 0 (ppm/°C.), and this value of dielectric constant was too small to permit the resonator to be made compact.

SUMMARY OF THE INVENTION

This invention was conceived to overcome the above problems. An objective of the invention is therefore to provide a dielectric ceramic for microwave applications with high dielectric constant $\epsilon_r$ and unloaded Q even when the temperature coefficient is in the region of 0 (ppm/°C.).

According to one aspect of the invention, a dielectric ceramic for microwave applications is comprised of barium oxide (BaO), titanium dioxide ($TiO_2$), samarium oxide ($Sm_2O_3$), lanthanum oxide ($La_2O_3$) and neodymium oxide ($Nd_2O_3$) represented by the formula:

$$X\,BaO.Y\,TiO_2.Z\{(Sm_2O_3)_{1-W_1-W_2}(La_2O_3)_{W_1}(Nd_2O_3)_{W_2}\}$$

where X, Y, Z lie in the ranges:

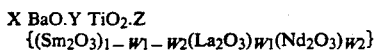

$11.0 \leq X \leq 22.0$ $60.0 \leq Y \leq 75.0$ $6.0 \leq Z \leq 28.0$ $X + Y + Z = 100$ expressed in mole %, and $0 < W_1 \leq 0.35$ $0 < W_2 < 1$ $0 < (1 - W_1 - W_2) < 1$ where $W_1$, $W_2$ and $(1 - W_1 - W_2)$ are mole ratios.

In addition to BaO, $TiO_2$, $Sm_2O_3$, $La_2O_3$, and $Nd_2O_3$, which are the main constituents, the dielectric ceramic may also contain $MnO_2$ as a supplementary constituent to the extent of no more than 3 wt %.

In addition to BaO, $TiO_2$, $Sm_2O_3$, $La_2O_3$, and $Nd_2O_3$, which are the main constituents, the dielectric ceramic may also contain $Al_2O_3$ as a supplementary constituent to the extent of no more than 3 wt %.

According to another aspect of the invention, a dielectric ceramic for microwave applications is comprised of barium oxide (BaO), titanium dioxide ($TiO_2$), samarium oxide ($Sm_2O_3$), lanthanum oxide ($La_2O_3$), neodymium oxide ($Nd_2O_3$) and bismuth oxide ($Bi_2O_3$), represented by the formula:

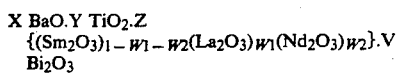

$$X\,BaO.Y\,TiO_2.Z\{(Sm_2O_3)_{1-W_1-W_2}(La_2O_3)_{W_1}(Nd_2O_3)_{W_2}\}.V\,Bi_2O_3$$

where X, Y, Z and V lie in the ranges:

$11.5 \leq X \leq 21.0$ $60.0 \leq Y \leq 76.0$ $6.5 \leq Z \leq 26.0$ $0.1 \leq V \leq 5.0$ $X + Y + Z + V = 100$ expressed in mole %, and $0 < W_1 < 1$ $0 < W_2 < 1$ $0 < (1 - W_1 - W_2) < 1$, where $W_1$, $W_2$ and $(1 - W_1 - W_2)$ are mole ratios.

In addition to the above described main constituents, the dielectric ceramic may also contain $MnO_2$ as a supplementary constituent, to the extent of no more than 2 wt %.

In addition to the above described main constituents, the dielectric ceramic may also contain cerium oxide ($CeO_2$), as a supplementary constituent, to the extent of no more than 5 wt %, this amount corresponding to 0.0606 mole per mole of the main constituents.

In addition to the above described main constituents, the dielectric ceramic may also contain lead oxide (PbO), as a supplementary constituent, to the extent of no more than 5 wt %, this corresponding to 0.0463 mole per mole of the main constituents.

In addition to the above described main constituents, the dielectric ceramic may also contain aluminum oxide ($Al_2O_3$), as a supplementary constituent, to the extent of no more than 3 wt %, this corresponding to 0.0609 mole per mole of the main constituents.

In this invention, the constituents of the dielectric ceramic for microwave applications are specified within the above limits, as a result, as will be clear from the following experimental results, the dielectric constant $\epsilon_r$ and unloaded Q are high even if said temperature coefficient $\tau_f$ is in the region of 0 (ppm/°C.), and the temperature coefficient $\tau_f$ can also be given any desired value above or below 0, i.e., positive or negative, by varying the composition.

DETAILED DESCRIPTION OF THE PREFERRED EMBODIMENTS

We shall now described this invention in more detail with reference to specific examples.

In the following description, Tables B1, B2, C1, A1, A2, D1, D2 and D3 that form the last part of the specification will be referred to. These Tables shows the results of the experiments or measurements on the examples according to the invention, and comparative examples.

In the attached Tables, sample numbers marked with the symbols "*" are comparative samples which are outside the scope of the invention, and other samples are examples according to the invention. Also, in the Tables, as well as in the following description, "wt %" denote percentage in weight.

EXAMPLE B $BaCO_3$, $TiO_2$, $Sm_2O_3$, $La_2O_3$, $Nd_2O_3$ and $MnCO_3$ of high purity were taken as starting materials, and mixed in the proportions shown in the attached Table B1 and Table B2. This mixture was calcined in air at 1060° C. for 2 hours. The calcined material was pulverized in a pot mill with pure water, dewatered and dried to obtain a powder. To the powder was added a binder to obtain a granule, which was then classified by passing through a 32 mesh sieve. The granule obtained was molded by a die at a pressure of 1 to 3 ton/cm$^2$ to form a circular plate of diameter 16 mm and thickness 9 mm. This molded product was then placed in a high purity alumina case and fired at a suitable temperature in the range 1250° C. to 1500° C. for 2 hours so as to obtain a dielectric ceramic material.

The dielectric constant $\epsilon_r$ and $Q_u$ of the material were measured by the Hakki-Coleman method. Further, the temperature coefficient $\tau_f$ of the resonant frequency was found by equation (1) below from the resonant frequencies at the temperatures −40° C. and +85° C., and the resonant frequency at the temperature 20° C. taken as a reference, and the experimental results were shown in Tables B1 and B2 attached. The resonant frequency in these measurements was 3 to 4 GHz.

$$\tau_f = \frac{f(85° C.) - f(-40° C.)}{f(20° C.)} \cdot \frac{1}{\Delta T} \text{ (ppm/°C.)} \quad (1)$$

where:
f (20° C.)=resonant frequency at 20° C.
f (85° C.)=resonant frequency at 85° C.
f (−40° C.)=resonant frequency at −40° C.
$\Delta$ T=measured temperature difference. In this case, $\Delta$ T=85−(−40)=125° C.

According to the results of Table B1, if the amount of BaO in the composition is less than 11.0 mole % or greater than 22.0 mole %, or alternatively if the amount of $TiO_2$ is less than 60.0 mole % or greater than 75.0 mole %, the unloaded Q ($Q_u$) becomes small and the temperature coefficient $\tau_f$ increases, which is undesirable. Further, if the total amount Z of rare earth oxides ($Sm_2O_3$, $La_2O_3$, $Nd_2O_3$) is less than 6.0 mole % or greater than 28.0 mole %, the dielectric constant $\epsilon_r$ and unloaded Q ($Q_u$) again become small and the temperature coefficient $\tau_f$ increases, which is undesirable. Further, if the mole ratio $W_1$ ($La_2O_3$) exceeds 0.35, the temperature coefficient $\tau_f$ is too large which is undesirable. Further, if the mole ratio $W_2$ ($Nd_2O_3$) or $(1-W_1-W_2)$ ($Sm_2O_3$) is zero, the temperature coefficient $\tau_f$ is either too negative or too positive, which is undesirable.

From the above results, therefore, it was found that if the composition of the main constituents is represented by:

$$X\, BaO.Y\, TiO_2.Z\{(Sm_2O_3)_{1-W_1-W_2}(La_2O_3)_{W_1}(Nd_2O_3)_{W_2}\}$$

where $11.0 \leq X \leq 22.0$ $60.0 \leq Y \leq 75.0$ $6.0 \leq Z \leq 28.0$ $X+Y+Z=100$ where the mole ratios are specified respectively by:

$0 < W_1 \leq 0.35$ $0 < W_2 < 1$ $0 < (1-W_1-W_2) < 1$ the composition is suitable for a dielectric ceramic for microwave applications.

Table B2 shows the results of measurements carried out on dielectric ceramics comprised of BaO, $TiO_2$, $Sm_2O_3$, $La_2O_3$ and $Nd_2O_3$ as main constituents with the further addition of $MnO_2$, together with the results for comparative examples. By increasing the amount of $MnO_2$, the unloaded Q ($Q_u$) can be increased and the temperature coefficient $\tau_f$ of the resonant frequency can be controlled.

If the amount of $MnO_2$ exceeds 3 wt %, however, the unloaded Q ($Q_u$) decreases and the temperature coefficient $\tau_f$ increases which is undesirable.

EXAMPLE C $BaCO_3$, $TiO_2$, $Sm_2O_3$, $La_2O_3$, $Nd_2O_3$ and $Al_2O_3$ of high purity were taken as starting materials, weighed out in the compositional proportions shown in the attached Table C1 (In Table C1, and other tables, the marks " signify "same as above"), and mixed with pure water in a pot mill. In this Example, the main constituents, i.e. $BaCO_3$, $TiO_2$, $Sm_2O_3$, $La_2O_3$ and $Nd_2O_3$, were mixed in two different proportions, and the amount of $Al_2O_3$ added as a supplementary constituent was varied.

This mixture was calcined in air at 1060° C. for 2 hours. The calcined material was processed in the same manner as in Example B to obtain the molded circular plate. The molded product was then placed in a high purity alumina case and fired at a suitable temperature in the range 1250° C. to 1400° C. so as to obtain a dielectric ceramic.

The dielectric constant $\epsilon_r$ and unloaded Q ($Q_u$) of the material were measured in the same manner as in the Embodiment B, and the temperature coefficient $\tau_f$ of the resonant frequency was found by equation (1).

The results of the experiments were shown in the attached Table C1.

According to the experimental results of Table C1, if the amount of $Al_2O_3$ added to the composition is no greater than 3 wt % with respect to the main constituents, there is not much change of dielectric constant $\epsilon_r$ and unloaded Q ($Q_u$), and in particular, if the amount is 0.2 wt %, unloaded Q ($Q_u$) increases. Further, as the amount of $Al_2O_3$ added increases, the temperature coefficient $\tau_f$ varies largely in the negative direction. If on the other hand the amount of $Al_2O_3$ is greater than 3 wt %, i.e. in the case of Sample No. 5 and No. 10, the dielectric constant $\epsilon_r$ and unloaded Q ($Q_u$) becomes smaller and the temperature coefficient $\tau_f$ becomes highly negative, which is undesirable.

From the above results, therefore, it was found that if the composition is represented by:

$$X \, BaO \cdot Y \, TiO_2 \cdot Z \{(Sm_2O_3)_{1-W_1-W_2}(La_2O_3)_{W_1}(Nd_2O_3)_{W_2}\}$$

with respect to the main constituents, where:

$11.0 \leq X \leq 22.0$ $60.0 \leq Y \leq 75.0$ $6.0 \leq Z \leq 28.0$ $X + Y + Z = 100$ expressed in mole %, where the mole ratios are specified respectively by:

$0 < W_1 \leq 0.35$ $0 < W_2 < 1$ $0 < (1 - W_1 - W_2) < 1.00$ and where $Al_2O_3$ is added to the main constituents to the extent of no more than 3 wt % (excluding 0 wt %), the composition is suitable as a dielectric ceramic for microwave applications. The 3 wt % of $Al_2O_3$ corresponds to 0.0563 mole of $Al_2O_3$ per mole of the main constituents, consisting of BaO, $TiO_2$, $Sm_2O_3$, $La_2O_3$ and $Nd_2O_3$.

EXAMPLE A $BaCO_3$, $TiO_2$, $Sm_2O_3$, $La_2O_3$, $Nd_2O_3$ and $Bi_2O_3$ of high purity were taken as starting materials, and mixed with pure water for 20 to 24 hours in a pot mill in the proportions shown in the attached Table A1 and Table A2. After dewatering the mixture and drying it, the mixed powder was calcined in a high purity alumina case at 1060° C. for 2 hours. The calcined material was processed in the same manner as in Example B to obtain the molded circular plate. This molded product was then placed in a high purity alumina case and fired at a suitable temperature in the range 1250° C. to 1450° C. for 2 hours so as to obtain a dielectric ceramic.

The dielectric constant $\epsilon_r$ and unloaded Q ($Q_u$) of the material were measured in the same manner as in the Embodiment B, and the temperature coefficient $\tau_f$ of the resonant frequency was found by equation (1).

The results of the experiments were shown in the attached Table A1.

According to the results of Table A1, if the amount of BaO in the composition is less than 11.5 mole % or greater than 21.0 mole %, or alternatively if the amount of $TiO_2$ is less than 60.0 mole % or greater than 76.0 mole %, the unloaded Q ($Q_u$) becomes small and the temperature coefficient $\tau_f$ increases, which is undesirable. Further, if the amount Z of rare earth oxides ($Sm_2O_3$, $la_2O_3$, $Nd_2O_3$) is less than 6.5 mole % or greater than 26.0 mole %, the dielectric constant $\epsilon_r$ and unloaded Q ($Q_u$) again become small and the temperature coefficient $\tau_f$ increases, which is undesirable.

Further, as the amount of $Bi_2O_3$ increases, dielectric constant $\epsilon_r$ and unloaded Q ($Q_u$) improve, but if it exceeds 5 mole %, unloaded Q ($Q_u$) decreases which is undesirable. Further, if the mole ratio $W_1$ ($La_2O_3$), $W_2$ ($Nd_2O_3$) or $(1-W_1-W_2)$ ($Sm_2O_3$) are zero, the unloaded Q ($Q_u$) is small or the temperature coefficient $\tau_f$ is high, which is undesirable.

From the above results, therefore, it was found that if the composition of the main constituents is represented by:

$$X \, BaO \cdot Y \, TiO_2 \cdot Z \{(Sm_2O_3)_{1-W_1-W_2}(La_2O_3)_{W_1}(Nd_2O_3)_{W_2}\} \cdot V \, Bi_2O_3$$

where $11.5 \leq X \leq 21.0$ $60.0 \leq Y \leq 76.0$ $6.5 \leq Z \leq 26.0$ $0.1 \leq V \leq 5.0$ $X + Y + Z + V = 100$ where the mole ratios are specified respectively by:

$0 < W_1 < 1$ $0 < W_2 < 1$ $0 < (1 - W_1 - W_2) < 1$ the composition is suitable for a dielectric ceramic for microwave applications.

Table A2 shows the results of measurements carried out on dielectric ceramics comprised of BaO, $TiO_2$, $Sm_2O_3$, $La_2O_3$, $Nd_2O_3$ and $Bi_2O_3$ as main constituents with the further addition of $MnO_2$, together with the results for Comparative Examples.

By increasing the amount of $MnO_2$, the unloaded Q ($Q_u$) can be increased and the temperature coefficient $\tau_f$ of the resonant frequency can be controlled. The sinterability of this dielectric ceramic composition also improved.

If the amount of $MnO_2$ exceeds 2 wt %, however, the unloaded Q ($Q_u$) decreases and the sinterability of the composition also declines, which is undesirable.

EXAMPLE D1

$BaCO_3$, $TiO_2$, $Sm_2O_3$, $La_2O_3$, $Na_2O_3$, $Bi_2O_3$, and $CeO_2$ of high purity were taken as starting materials, weighted out in the proportions shown in the attached Table D1, and mixed with pure water in a pot mill. In this Example, the main constituents, i.e. $BaCO_3$, $TiO_2$, $Sm_2O_3$, $La_2O_3$, $Nd_2O_3$ and $Bi_2O_3$, were mixed in two different proportions, and the amount of $CeO_2$ added as a supplementary constituent was varied.

This mixture was calcined in air at 1060° C. for 2 hours. The calcined material was processed in the same manner as in Example B to obtain the molded circular plate. This molded product was then placed in a high purity alumina case and fired at a suitable temperature in the range 1250° C. to 1400° C. for 2 hours so as to obtain a dielectric ceramic.

The dielectric constant $\epsilon_r$ and unloaded Q ($Q_u$) of the material were measured in the same manner as in the Embodiment B, and the temperature coefficient $\tau_f$ of the resonant frequency was found by equation (1).

The results of the experiments were shown in the attached Table D1.

According to the measurement results of Table D1, as the amount of cerium oxide ($CeO_2$) is increased with respect to the main constituents, dielectric constant $\epsilon_r$ and unloaded Q ($Q_u$) decrease after passing through a maximum, while the temperature coefficient $\tau_f$ increases after passing through a minimum. The dielectric constant $\epsilon_r$ exhibits a maximum of $\epsilon_r = 89.5$ when addition of $CeO_2$ is 0.2 wt %, and unloaded Q ($Q_u$) exhibits a maximum of 2310 when addition of $CeO_2$ is 3 wt %. Subsequently, both dielectric constant $\epsilon_r$ and unloaded Q ($Q_u$) decline. It was found that for compositions where the addition of $CeO_2$ exceeds 5 wt %, i.e. Sample No. 6 and No. 12, dielectric constant $\epsilon_r$ falls to a very low value of approx. 40, which is undesirable.

From the above results, therefore, it was found that if the composition is represented by:

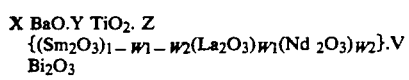

X BaO.Y $TiO_2$. Z $\{(Sm_2O_3)_{1-W_1-W_2}(La_2O_3)_{W_1}(Nd_2O_3)_{W_2}\}$.V $Bi_2O_3$ with respect to the main constituents, where:

$11.5 \leq X \leq 21.0$ $60.0 \leq Y \leq 76.0$ $6.5 \leq Z \leq 26.0$ $0.1 \leq V \leq 5.0$ $X + Y + Z + V = 100$ expressed in mole %, the mole ratios are specified respectively by:
$0 < W_1 < 1.0$ $0 < W_2 < 1.0$ $0 < (1 - W_1 - W_2) < 1.0$, and $CeO_2$ is also added to the main constituents to the extent of no more than 5 wt % (excluding 0 wt %), the composition is suitable as a dielectric ceramic for microwave applications. This 5 wt % of $CeO_2$ corresponds to 0.0606 mole of $CeO_2$ per mole of the main constituents. The sinterability of this dielectric ceramic composition was also improved.

EXAMPLE D2

$BaCO_3$, $TiO_2$, $Sm_2O_3$, $La_2O_3$, $Nd_2O_3$, $Bi_2O_3$, and PbO of high purity were taken as starting materials, weighed out in the compositional proportions shown in the attached Table D1, and mixed with pure water in a pot mill. In this Example, the main constituents, i.e. $BaCO_3$, $TiO_2$, $Sm_2O_3$, $La_2O_3$, $Nd_2O_3$ and $Bi_2O_3$ were mixed in two different proportions, and the amount of PbO added as a supplementary constituent was varied.

This mixture was calcined in air at 1060° C. for 2 hours. The calcined material was processed in the same manner as in Example B to obtain the molded circular plate. This molded product was then placed in a high purity alumina case and fired at a suitable temperature in the range 1250° C. to 1400° C. for 2 hours so as to obtain a dielectric ceramic.

The dielectric constant $\epsilon_r$ and unloaded Q ($Q_u$) of the material were measured in the same manner as in the Embodiment B, and the temperature coefficient $\tau_f$ of the resonant frequency was found by equation (1).

The results of the experiments were shown in the attached Table D2.

According to the measurement results of Table D2, as the amount of lead oxide (PbO) is increased with respect to the main constituents, dielectric constant $\epsilon_r$ increases up to 5 wt %, passes through a maximum of $\epsilon_r = 95.2$, and then decreases. Unloaded Q ($Q_u$), on the other hand, decreases with increasing addition of PbO, and falls sharply when addition exceeds 5 wt %. Further, temperature coefficient $\tau_f$ exhibits a minimum at an addition of 3 wt %, then it begins to increase and rises sharply when addition exceeds 5 wt %. As Sample No. 6 and No. 12, have an unloaded Q ($Q_u$) no greater than 1000 and a highly positive temperature coefficient, it is seen that they are undesirable.

From the above results, therefore, it was found that if the composition is represented by:

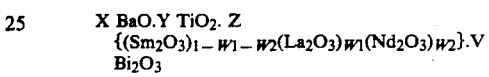

X BaO.Y $TiO_2$. Z $\{(Sm_2O_3)_{1-W_1-W_2}(La_2O_3)_{W_1}(Nd_2O_3)_{W_2}\}$.V $Bi_2O_3$ with respect to the main constituents, where:

$11.5 \leq X \leq 21.0$ $60.0 \leq Y \leq 76.0$ $6.5 \leq Z \leq 26.0$ $0.1 \leq V \leq 5.0$ $X + Y + Z + V = 100$ expressed in mole %, the mole ratios are specified respectively by:
$0 < W_1 < 1.0$ $0 < W_2 < 1.0$ $0 < (1 - W_1 - W_2) < 1.0$, and PbO is also added to the main constituents to the extent of no more than 5 wt % (excluding 0 wt %), the composition is suitable as a dielectric ceramic for microwave applications. This 5 wt % of PbO corresponds to 0.0463 of PbO per mole of the main constituents. The sinterability of this dielectric ceramic composition was also improved.

EXAMPLE D3

$BaCO_3$, $TiO_2$, $Sm_2O_3$, $La_2O_3$, $Nd_2O_3$, $Bi_2O_3$ and $Al_2O_3$ of high purity were taken as starting materials, weighed out in the compositional proportions shown in the attached Table D1, and mixed with pure water in a pot mill. In this Example, the main constituents, i.e. $BaCO_3$, $TiO_2$, $Sm_2O_3$, $La_2O_3$, $Nd_2O_3$ and $Bi_2O_3$ were mixed in two different proportions, and the amount of $Al_2O_3$ added as a supplementary constituent was varied.

This mixture was calcined in air at 1060° C. for 2 hours. The calcined material was processed in the same manner as in Example B to obtain the molded circular plate. This molded product was then placed in a high purity alumina case and fired at a suitable temperature in the range 1250° C. to 1450° C. for 2 hours so as to obtain a dielectric ceramic.

The dielectric constant $\epsilon_r$ and unloaded Q ($Q_u$) of the material were measured in the same manner as in the Embodiment B, and the temperature coefficient $\tau_f$ of the resonant frequency was found by equation (1).

The results of the experiments were shown in the attached Table D3.

According to the measurement results of Table D3, if the addition of aluminum oxide ($Al_2O_3$) is no greater than 3 wt %, with respect to the main constituents, the dielectric constant $\epsilon_r$ becomes slightly less, but it does not decrease very much. Further, if the addition is not greater than 1 wt %, unloaded Q ($Q_u$) increases. Further, as addition of $Al_2O_3$ increases, the temperature coefficient $\tau_f$ goes highly negative, and it is thus possible to change the sign of the coefficient from positive to negative by adjusting the addition of $Al_2O_3$.

If on the other hand the addition of $Al_2O_3$ is greater than 3 wt %, i.e. in the case of Sample No. 6 and No. 12, the dielectric constant $\epsilon_r$ is no greater than 50, the unloaded Q ($Q_u$) decreases to 1000 or less and the temperature coefficient $\tau_f$ goes very highly negative. It is evident that these properties are undesirable.

From the above results, therefore, it was found that if the composition is represented by:

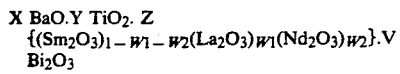
$X$ BaO.$Y$ TiO$_2$. $Z$
$\{(Sm_2O_3)_{1-W_1-W_2}(La_2O_3)_{W_1}(Nd_2O_3)_{W_2}\}$.$V$ Bi$_2$O$_3$ with respect to the main constituents, where:

$11.5 \leq X \leq 21.0$ $60.0 \leq Y \leq 76.0$ $6.5 \leq Z \leq 26.0$ $0.1 \leq V \leq 5.0$ $X+Y+Z+V=100$ expressed in mole %, the mole ratios are specified respectively by:

$0 < W_1 < 1.0$ $0 < W_2 < 1.0$ $0 < (1-W_1-W_2) < 1.0$, and $Al_2O_3$ is also added to the main constituents to the extent of no more than 3 wt % (excepting 0 wt %), the composition is suitable as a dielectric ceramic for microwave applications. This 3 wt % of $Al_2O_3$ corresponds to 0.0609 mole of $Al_2O_3$ per mole of the main constituents.

It should be understood that this invention is not limited to the Examples given in the Tables, and compositions which have different amounts of supplementary constituents within the specified range with respect to other combinations of the main constituents within the specified range, will give similar results to those of the above Examples.

As is clear from the above description of the various embodiments or examples, in the microwave region, the dielectric constant $\epsilon_r$ and unloaded Q ($Q_u$) of the composition of this invention are high, and furthermore, the temperature coefficient $\tau_f$ of the resonant frequency can be varied over a wide range by varying the composition.

The composition can therefore be used as a dielectric ceramic (porcelain) for microwave resonators or for temperature compensation capacitors, and it has a high industrial value.

TABLE B1

| No. | X (mole %) | Y (mole %) | Z (mole %) | 1-W$_1$-W$_2$ | W$_1$ | W$_2$ | $\epsilon_r$ | $Q_u$ | $\tau_f$ (ppm/°C.) |
|---|---|---|---|---|---|---|---|---|---|
| 1* | 15.9 | 68.2 | 15.9 | 1 | 0 | 0 | 78.4 | 2,510 | −140 |
| 2* | 15.9 | 68.2 | 15.9 | 0.46 | 0.54 | 0 | 78.1 | 1,694 | 159 |
| 3 | 15.9 | 68.2 | 15.9 | 0.70 | 0.15 | 0.15 | 74.2 | 2,597 | −19 |
| 4 | 15.9 | 68.2 | 15.9 | 0.50 | 0.15 | 0.35 | 76.6 | 2,844 | 21 |
| 5 | 15.9 | 68.2 | 15.9 | 0.30 | 0.15 | 0.55 | 77.9 | 2,902 | 37 |
| 6 | 15.9 | 68.2 | 15.9 | 0.10 | 0.15 | 0.75 | 78.5 | 2,698 | 82 |
| 7 | 15.9 | 68.2 | 15.9 | 0.50 | 0.35 | 0.15 | 79.1 | 2,464 | 75 |
| 8 | 15.9 | 68.2 | 15.9 | 0.30 | 0.35 | 0.35 | 78.2 | 2,363 | 99 |
| 9 | 15.9 | 68.2 | 15.9 | 0.40 | 0.05 | 0.55 | 82.4 | 2,348 | 14 |
| 10 | 15.9 | 68.2 | 15.9 | 0.30 | 0.05 | 0.65 | 82.5 | 2,357 | 37 |
| 11* | 15.9 | 68.2 | 15.9 | 0.13 | 0.52 | 0.35 | 78.3 | 1,863 | 173 |
| 12* | 15.9 | 68.2 | 15.9 | 0 | 0.48 | 0.52 | 75.1 | 1,750 | 154 |
| 13* | 15.9 | 68.2 | 15.9 | 0 | 0 | 1 | 84.1 | 2,210 | 120 |
| 14 | 16.7 | 66.6 | 16.7 | 0.20 | 0.05 | 0.75 | 83.1 | 2,263 | 56 |
| 15 | 16.7 | 66.6 | 16.7 | 0.10 | 0.05 | 0.85 | 83.3 | 2,303 | 72 |
| 16* | 16.7 | 66.0 | 16.7 | 0.03 | 0 | 0.97 | 79.5 | 2,128 | 121 |
| 17 | 19.0 | 75.0 | 6.0 | 0.5 | 0.15 | 0.35 | 72.3 | 2,200 | 43 |
| 18* | 25.0 | 72.5 | 2.5 | 0.50 | 0.35 | 0.15 | 51.2 | 1,218 | 106 |
| 19* | 9.0 | 71.0 | 20.0 | 0.50 | 0.35 | 0.15 | 55.7 | 1,139 | 143 |
| 20* | 18.0 | 50.0 | 32.0 | 0.50 | 0.35 | 0.15 | 54.2 | 872 | 131 |
| 21 | 11.0 | 61.0 | 28.0 | 0.50 | 0.15 | 0.35 | 72.3 | 1,800 | 31 |
| 22* | 11.0 | 80.0 | 9.0 | 0.50 | 0.35 | 0.15 | 59.3 | 1,132 | 116 |
| 23 | 22.0 | 60.0 | 18.0 | 0.24 | 0.23 | 0.53 | 58.8 | 1,790 | 74 |

TABLE B2

| No. | X | Y | Z | W$_1$ | W$_2$ | MnO$_2$ | $\epsilon_r$ | $Q_u$ | $\tau_f$ (ppm/°C.) |
|---|---|---|---|---|---|---|---|---|---|
| 1* | 19.2 | 67.5 | 13.3 | 0.25 | 0.35 | 0 | 74.5 | 1,852 | 19 |
| 2 | 19.2 | 67.5 | 13.3 | 0.25 | 0.35 | 0.5 | 75.1 | 2,133 | 15 |
| 3 | 19.2 | 67.5 | 13.3 | 0.25 | 0.35 | 1.5 | 76.6 | 2,427 | 25 |

TABLE B2-continued

| No. | X | Y | Z | $W_1$ | $W_2$ | $MnO_2$ | $\epsilon_r$ | $Q_u$ | $\tau_f$ (ppm/°C.) |
|---|---|---|---|---|---|---|---|---|---|
| 4 | 19.2 | 67.5 | 13.3 | 0.25 | 0.35 | 3.0 | 75.0 | 2,111 | 47 |
| 5* | 19.2 | 67.5 | 13.3 | 0.25 | 0.35 | 5.0 | 74.1 | 960 | 96 |

TABLE C1

| No. | X | Y | Z | $1-W_1-W_2$ | $W_1$ | $W_2$ | $Al_2O_3$ (wt %) | $\epsilon_r$ | $Q_u$ | $\tau_f$ (ppm/%) |
|---|---|---|---|---|---|---|---|---|---|---|
| 1* | 16.7 | 66.6 | 16.7 | 0.20 | 0.05 | 0.75 | 0 | 83.1 | 2260 | 56 |
| 2 | " | " | " | " | " | " | 0.2 | 82.9 | 2410 | 45 |
| 3 | " | " | " | " | " | " | 1 | 81.8 | 2170 | 15 |
| 4 | " | " | " | " | " | " | 3 | 79.5 | 1950 | −45 |
| 5* | " | " | " | " | " | " | 10 | 43.1 | 750 | −150 |
| 6* | 22.0 | 60.0 | 18.0 | 0.24 | 0.23 | 0.53 | 0 | 58.8 | 1790 | 74 |
| 7 | " | " | " | " | " | " | 0.2 | 58.5 | 1920 | 66 |
| 8 | " | " | " | " | " | " | 1 | 57.8 | 1830 | 23 |
| 9 | " | " | " | " | " | " | 3 | 55.9 | 1630 | −21 |
| 10* | " | " | " | " | " | " | 10 | 38.5 | 600 | −125 |

TABLE A1

| NO | BaO X | $TiO_2$ Y | RE Z | $Sm_2O_3$ $1-W_1-W_2$ | $La_2O_3$ $W_1$ | $Nd_2O_3$ $W_2$ | $Bi_2O_3$ V | $\epsilon_r$ | $Q_u$ | $\tau_f$ (ppm/°C.) |
|---|---|---|---|---|---|---|---|---|---|---|
| 1 | 15.63 | 66.71 | 15.63 | 0.835 | 0.133 | 0.032 | 2.03 | 77.0 | 2010 | −86 |
| 2 | 15.63 | 66.71 | 15.63 | 0.624 | 0.122 | 0.254 | 2.03 | 82.2 | 1810 | −51 |
| 3 | 15.63 | 66.71 | 15.63 | 0.435 | 0.168 | 0.397 | 2.03 | 85.5 | 1910 | −35 |
| 4 | 15.63 | 66.71 | 15.63 | 0.281 | 0.196 | 0.423 | 2.03 | 88.1 | 1890 | −20 |
| 5 | 15.63 | 66.71 | 15.63 | 0.118 | 0.178 | 0.704 | 2.03 | 91 | 2015 | 5 |
| 6* | 14.63 | 68.23 | 14.63 | 0.240 | 0.760 | 0 | 2.51 | 77.5 | 1010 | 117 |
| 7* | 14.63 | 68.23 | 14.63 | 0 | 0.644 | 0.356 | 2.51 | 75.4 | 1205 | 123 |
| 8 | 14.0 | 72.0 | 14.0 | 0.333 | 0.541 | 0.126 | 4.62 | 87.0 | 1750 | 59 |
| 9 | 14.0 | 72.0 | 14.0 | 0.180 | 0.470 | 0.350 | 4.62 | 91.4 | 1510 | 68 |
| 10* | 14.0 | 72.0 | 14.0 | 0.440 | 0 | 0.560 | 4.62 | 73.6 | 1770 | 116 |
| 11* | 26.5 | 71.5 | 2.0 | 0.340 | 0.280 | 0.380 | 1.05 | 53.1 | 960 | 110 |
| 12* | 11.5 | 84.0 | 4.5 | 0.340 | 0.280 | 0.380 | 1.05 | 51.2 | 1060 | 136 |
| 13 | 21.0 | 72.5 | 6.5 | 0.340 | 0.280 | 0.380 | 1.05 | 54.2 | 1790 | 63 |
| 14 | 21.0 | 60.0 | 19.0 | 0.340 | 0.280 | 0.380 | 1.05 | 68.2 | 1670 | 51 |
| 15* | 21.0 | 53.5 | 25.5 | 0.16 | 0.37 | 0.47 | 1.51 | 54.2 | 880 | 113 |
| 16* | 8.0 | 60.0 | 32.0 | 0.16 | 0.37 | 0.47 | 1.51 | 53.9 | 940 | 121 |
| 17 | 11.5 | 76.0 | 12.5 | 0.16 | 0.37 | 0.47 | 1.51 | 71.3 | 1860 | 61 |
| 18 | 12.0 | 60.0 | 26.0 | 0.16 | 0.37 | 0.47 | 1.51 | 73.6 | 1790 | 33 |
| 19* | 15.74 | 68.52 | 15.74 | 0.58 | 0.31 | 0.11 | 0 | 81.7 | 1830 | 55 |
| 20 | 15.71 | 68.40 | 15.71 | 0.58 | 0.31 | 0.11 | 0.10 | 88.6 | 1860 | 47 |
| 21 | 15.05 | 65.51 | 15.05 | 0.58 | 0.31 | 0.11 | 4.40 | 94.5 | 1960 | 16 |
| 22 | 14.31 | 66.38 | 14.31 | 0.58 | 0.31 | 0.11 | 5.00 | 85.1 | 1570 | 53 |
| 23* | 13.12 | 63.76 | 13.12 | 0.58 | 0.31 | 0.11 | 10.00 | 80.9 | 960 | 115 |

TABLE A2

| NO. | BaO X | $TiO_2$ Y | RE Z | $Sm_2O_3$ $1-W_1-W_2$ | $La_2O_3$ $W_1$ | $Nd_2O_3$ $W_2$ | $Bi_2O_3$ V | $MnO_2$ O | $\epsilon_r$ | $Q_u$ | $\tau_f$ (ppm/°C.) |
|---|---|---|---|---|---|---|---|---|---|---|---|
| 1* | 18.7 | 68.7 | 10.85 | 0.32 | 0.27 | 0.41 | 1.75 | 0 | 76.3 | 1790 | 34 |
| 2 | 18.7 | 68.7 | 10.85 | 0.32 | 0.27 | 0.41 | 1.75 | 0.3 | 77.8 | 2065 | 29 |
| 3 | 18.7 | 68.7 | 10.85 | 0.32 | 0.27 | 0.41 | 1.75 | 1.1 | 78.1 | 2130 | 23 |
| 4 | 18.7 | 68.7 | 10.85 | 0.32 | 0.27 | 0.41 | 1.75 | 2.0 | 77.6 | 2145 | 31 |
| 5* | 18.7 | 68.7 | 10.85 | 0.32 | 0.27 | 0.41 | 1.75 | 3.5 | 75.9 | 1063 | 77 |

TABLE D1

| No. | BaO X | $TiO_2$ Y | RE Z | $Sm_2O_3$ $1-W_1-W_2$ | $La_2O_3$ $W_1$ | $Nd_2O_3$ $W_2$ | $Bi_2O_3$ V | $CeO_2$ (wt %) | $\epsilon_r$ | $Q_u$ | $\tau_f$ (ppm/°C.) |
|---|---|---|---|---|---|---|---|---|---|---|---|
| 1* | 15.63 | 66.71 | 15.63 | 0.281 | 0.296 | 0.423 | 2.03 | 0 | 88.1 | 1890 | 28 |
| 2 | " | " | " | " | " | " | " | 0.2 | 89.5 | 1980 | 21 |
| 3 | " | " | " | " | " | " | " | 1 | 87.5 | 2050 | 8 |
| 4 | " | " | " | " | " | " | " | 3 | 83.2 | 2310 | −16 |
| 5 | " | " | " | " | " | " | " | 5 | 75.3 | 1950 | 10 |
| 6* | " | " | " | " | " | " | " | 10 | 38.1 | 1310 | 65 |
| 7* | 14.31 | 66.38 | 14.31 | 0.58 | 0.31 | 0.11 | 5.0 | 0 | 85.1 | 1570 | 53 |
| 8 | " | " | " | " | " | " | " | 0.2 | 86.3 | 1630 | 47 |
| 9 | " | " | " | " | " | " | " | 1 | 88.6 | 1890 | 26 |
| 10 | " | " | " | " | " | " | " | 3 | 84.7 | 2140 | 12 |
| 11 | " | " | " | " | " | " | " | 5 | 78.3 | 1710 | 29 |
| 12* | " | " | " | " | " | " | " | 10 | 42.6 | 1290 | 92 |

TABLE D2

| No. | BaO X | TiO$_2$ Y | RE Z | Sm$_2$O$_3$ 1-W$_1$-W$_2$ | La$_2$O$_3$ W$_1$ | Nd$_2$O$_3$ W$_2$ | Bi$_2$O$_3$ V | PbO (wt %) | $\epsilon_r$ | $Q_u$ | $\tau_f$ (ppm/°C.) |
|---|---|---|---|---|---|---|---|---|---|---|---|
| 1* | 15.63 | 66.71 | 15.63 | 0.281 | 0.296 | 0.423 | 2.03 | 0 | 88.1 | 1890 | 28 |
| 2 | " | " | " | " | " | " | " | 0.2 | 88.7 | 1840 | 21 |
| 3 | " | " | " | " | " | " | " | 1 | 89.9 | 1780 | 13 |
| 4 | " | " | " | " | " | " | " | 3 | 93.5 | 1670 | 5 |
| 5 | " | " | " | " | " | " | " | 5 | 95.2 | 1530 | 20 |
| 6* | " | " | " | " | " | " | " | 10 | 82.6 | 820 | 86 |
| 7* | 14.31 | 66.38 | 14.31 | 0.58 | 0.31 | 0.11 | 5.0 | 0 | 85.1 | 1570 | 53 |
| 8 | " | " | " | " | " | " | " | 0.2 | 86.0 | 1540 | 46 |
| 9 | " | " | " | " | " | " | " | 1 | 87.2 | 1490 | 34 |
| 10 | " | " | " | " | " | " | " | 3 | 89.7 | 1440 | 26 |
| 11 | " | " | " | " | " | " | " | 5 | 92.5 | 1380 | 41 |
| 12* | " | " | " | " | " | " | " | 10 | 81.3 | 720 | 103 |

TABLE D3

| No. | BaO X | TiO$_2$ Y | RE Z | Sm$_2$O$_3$ 1-W$_1$-W$_2$ | La$_2$O$_3$ W$_1$ | Nd$_2$O$_3$ W$_2$ | Bi$_2$O$_3$ V | Al$_2$O$_3$ (wt %) | $\epsilon_r$ | $Q_u$ | $\tau_f$ (ppm/°C.) |
|---|---|---|---|---|---|---|---|---|---|---|---|
| 1* | 15.63 | 66.71 | 15.63 | 0.281 | 0.296 | 0.423 | 2.03 | 0 | 88.1 | 1890 | 28 |
| 2 | " | " | " | " | " | " | " | 0.1 | 87.8 | 1980 | 17 |
| 3 | " | " | " | " | " | " | " | 0.5 | 86.2 | 2120 | 6 |
| 4 | " | " | " | " | " | " | " | 1 | 84.6 | 1980 | −13 |
| 5 | " | " | " | " | " | " | " | 3 | 78.6 | 1780 | −39 |
| 6* | " | " | " | " | " | " | " | 10 | 46.5 | 920 | −118 |
| 7* | 14.31 | 66.38 | 14.31 | 0.58 | 0.31 | 0.11 | 5.0 | 0 | 85.1 | 1570 | 53 |
| 8 | " | " | " | " | " | " | " | 0.1 | 84.9 | 1690 | 39 |
| 9 | " | " | " | " | " | " | " | 0.5 | 83.6 | 1830 | 23 |
| 10 | " | " | " | " | " | " | " | 1 | 82.2 | 1660 | −8 |
| 11 | " | " | " | " | " | " | " | 3 | 76.7 | 1510 | −28 |
| 12* | " | " | " | " | " | " | " | 10 | 39.8 | 710 | −89 |

What is claimed is:

1. A dielectric ceramic for microwave applications consisting essentially of the components barium oxide (BaO), titanium dioxide (TiO$_2$), samarium oxide (Sm$_2$O$_3$), lanthanum oxide (La$_2$O$_3$) and neodymium oxide (Nd$_2$O$_3$) represented by the formula:

x BaO.Y TiO$_2$.Z
{(Sm$_2$O$_3$)$_{1-W_1-W_2}$(La$_2$O$_3$)$_{W_1}$(Nd$_2$O$_3$)$_{W_2}$} where X, Y, Z lie in the ranges:

$11.0 \leq X \leq 22.0$ $60.0 \leq Y \leq 75.0$ $6.0 \leq Z \leq 28.0$ $X+Y+Z=100$ expressed in mole %, and $0 \leq W_1 \leq 0.35$ $0 < W_2 < 1$ $0 < (1-W_1-W_2) < 1$ where W$_1$, W$_2$ and (1−W$_1$−W$_2$) are mole ratios and wherein said components are present in sufficient amounts as to produce a dielectric ceramic having a high dielectric constant, a high unloaded Q and a temperature coefficient variable above and below 0ppm/°C.

2. A dielectric ceramic according to claim 1 in which, MnO$_2$ is also added, as a supplementary constituent, to the extent of no more than 3 wt %.

3. A dielectric ceramic according to claim 1 in which, Al$_2$O$_3$ has also been added, as a supplementary constituent, to the extent of no more than 3 wt %, this corresponding to 0.0563 mole per mole of the main constituents.

4. A dielectric ceramic for microwave applications consisting essentially of the components barium oxide (BaO), titanium dioxide (TiO$_2$), samarium oxide (Sm$_2$O$_3$), lanthanum oxide (La$_2$O$_3$), neodymium oxide (Nd$_2$O$_3$) and bismuth oxide (Bi$_2$O$_3$), represented by the formula:

X BaO.Y TiO$_2$.Z
{(Sm$_2$O$_3$)$_{1-W_1-W_2}$(La$_2$O$_3$)$_{W_1}$(Nd$_2$O$_3$)$_{W_2}$}.V Bi$_2$O$_3$ where X, Y, Z and V lie in the ranges:

$11.5 \leq X \leq 21.0$ $60.0 \leq Y \leq 76.0$ $6.5 \leq Z \leq 26.0$ $0.1 \leq V \leq 5.0$ $X+Y+Z+V=100$ expressed in mole %, and $0 < W_1 < 1$ $0 < W_2 < 1$ $0 < (1-W_1-W_2) < 1$, where W$_1$, W$_2$ and (1−W$_1$−W$_2$) are mole ratios and wherein said components are present in sufficient amounts as to produce a dielectric ceramic having a high dielectric constant, a high unloaded Q and a temperature coefficient variable above and below 0° C.

5. A dielectric ceramic according to claim 4 in which, to MnO$_2$ is also added to the extent of no more than 2 wt %.

6. A dielectric ceramic according to claim 4, in which cerium oxide (CeO$_2$) is also added, as a supplementary constituent, to the extent of no more than 5 wt %, this amount corresponding to 0.0606 mole per mole of the main constituents.

7. A dielectric ceramic according to claim 4 in which, to lead oxide (PbO) is also added, as a supplementary constituent, to the extent of no more than 5 wt %, this corresponding to 0.0463 mole per mole of the main constituents.

8. A dielectric ceramic according to claim 4, in which aluminum oxide (Al$_2$O$_3$) is also added, as a supplementary constituent, to the extent of no more than 3 wt %, this corresponding to 0.0609 mole per mole of the main constituents.

9. A dielectric ceramic according to claim 1 in which the temperature coefficient is in the low temperature coefficient range.

10. A dielectric ceramic according to claim 4 in which the temperature coefficient is in the low temperature coefficient range.

11. A dielectric ceramic according to claim 1 in which the temperature coefficient is in the vicinity of 0ppm/°C.

12. A dielectric ceramic according to claim 4 in which the temperature coefficient is in the vicinity of 0ppm/°C.

13. A dielectric ceramic according to claim 9 in which the temperature coefficient is below 0ppm/°C.

14. A dielectric ceramic according to claim 10 in which the temperature coefficient is below 0ppm/°C.

* * * * *